(12) United States Patent
Wysocki et al.

(10) Patent No.: US 11,874,145 B2
(45) Date of Patent: Jan. 16, 2024

(54) ENHANCED BACKSCATTER FIBER WITH TAPERING ENHANCEMENT

(71) Applicants: Paul Wysocki, Blacksburg, VA (US); Dan Provenzano, Blacksburg, VA (US); Zhao Li, Blacksburg, VA (US)

(72) Inventors: Paul Wysocki, Blacksburg, VA (US); Dan Provenzano, Blacksburg, VA (US); Zhao Li, Blacksburg, VA (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 252 days.

(21) Appl. No.: 17/386,871

(22) Filed: Jul. 28, 2021

(65) Prior Publication Data

US 2023/0033128 A1 Feb. 2, 2023

(51) Int. Cl.
*G01D 5/353* (2006.01)
*E21B 47/135* (2012.01)
*G01H 9/00* (2006.01)
*G02B 6/02* (2006.01)

(52) U.S. Cl.
CPC ........... *G01D 5/353* (2013.01); *E21B 47/135* (2020.05); *G01H 9/004* (2013.01); *G02B 6/0208* (2013.01); *G02B 6/02076* (2013.01)

(58) Field of Classification Search
None
See application file for complete search history.

(56) References Cited

U.S. PATENT DOCUMENTS

| 5,615,008 | A | * | 3/1997 | Stachelek | G01J 3/1804 385/37 |
|---|---|---|---|---|---|
| 11,162,852 | B1 | * | 11/2021 | Jeyapaul | G01L 9/0077 |
| 2011/0110621 | A1 | * | 5/2011 | Duncan | G01D 5/35316 385/13 |
| 2017/0010385 | A1 | | 1/2017 | Englich et al. | |
| 2018/0045543 | A1 | * | 2/2018 | Farhadiroushan | G01D 5/35374 |
| 2019/0064387 | A1 | | 2/2019 | Ohanian, III et al. | |
| 2020/0013464 | A1 | * | 1/2020 | Wood | B64D 43/00 |

(Continued)

FOREIGN PATENT DOCUMENTS

EP 3321648 B1 5/2018

OTHER PUBLICATIONS

International Search Report and Written Opinion Issued in International Application No. PCT/US2022/074016 dated Oct. 31, 2022; 11 Pages.

*Primary Examiner* — Dominic J Bologna
(74) *Attorney, Agent, or Firm* — CANTOR COLBURN LLP (57) ABSTRACT

An optical system performs a method for measuring an acoustic signal in a wellbore. The optical system includes a light source, an optical fiber and a detector. The light source generates a light pulse. The optical fiber has a first end for receiving the light pulse from the light source and a plurality of enhancement scatterers spaced along a length of the optical fiber for reflecting the light pulse. A longitudinal density of the enhancement scatterers increases with a distance from the first end to increase a signal enhancement generated by the enhancement scatterers distal from the first end. The detector is at the first end of the optical fiber and measures a reflection of the light pulse at the enhancement scatterers to determine the acoustic signal.

15 Claims, 4 Drawing Sheets

(56) References Cited

U.S. PATENT DOCUMENTS

2021/0180447 A1 6/2021 Wysocki et al.
2021/0222540 A1 7/2021 Kroczka et al.

\* cited by examiner

ENHANCED BACKSCATTER FIBER WITH TAPERING ENHANCEMENT

BACKGROUND

In the resource recovery industry, acoustic downhole measurements can be obtained using an optical interrogation system including an optical interrogator at a surface location and an optical fiber extending from the optical interrogator into a wellbore. The optical interrogator transmits a light along a length of the fiber. The optical fiber generally has a plurality of scattering sites, or scatterers, due to various imperfections along the optical fiber. These scatterers reflect light back to the optical interrogator via Rayleigh scattering. An acoustic signal crossing the optical fiber causes a change in intensity of the reflected signal. Due to signal attenuation along the optical fiber, the greater the distance the light travels, the weaker the signal received back at the optical interrogator. For an optical fiber that extends over a distance of several kilometers through a wellbore, the signal attenuation signal at greater optical distances can have an effect on the quality of measurements obtained from the wellbore. Therefore, it is desirable to be able to enhance the intensity of signals reflected from very distant locations along the optical fiber.

SUMMARY

In one aspect, an optical system for measuring an acoustic signal in a wellbore is disclosed. The optical system includes a light source, an optical fiber and a detector. The light source generates a light pulse. The optical fiber has a first end for receiving the light pulse from the light source and a plurality of enhancement scatterers spaced along a length of the optical fiber for reflecting the light pulse, wherein a longitudinal density of the enhancement scatterers increases with a distance from the first end to increase a signal enhancement generated by the enhancement scatterers distal from the first end. The detector is at the first end of the optical fiber and measures a reflection of the light pulse at the enhancement scatterers to determine the acoustic signal.

In another aspect, a method for obtaining an acoustic measurement in a wellbore is disclosed. A pulse of light is transmitted from a light source into a first end of an optical fiber, the optical fiber having a plurality of enhancement scatterers spaced along a length of the optical fiber for enhancing the light signal, wherein a longitudinal density of the enhancement scatterers decreases with a distance from the first end to increase a signal enhancement generated by enhancement scatterers distal from the first end. A reflection of the light pulse from the enhancement scatterers is received at a detector at the first end to determine the acoustic signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
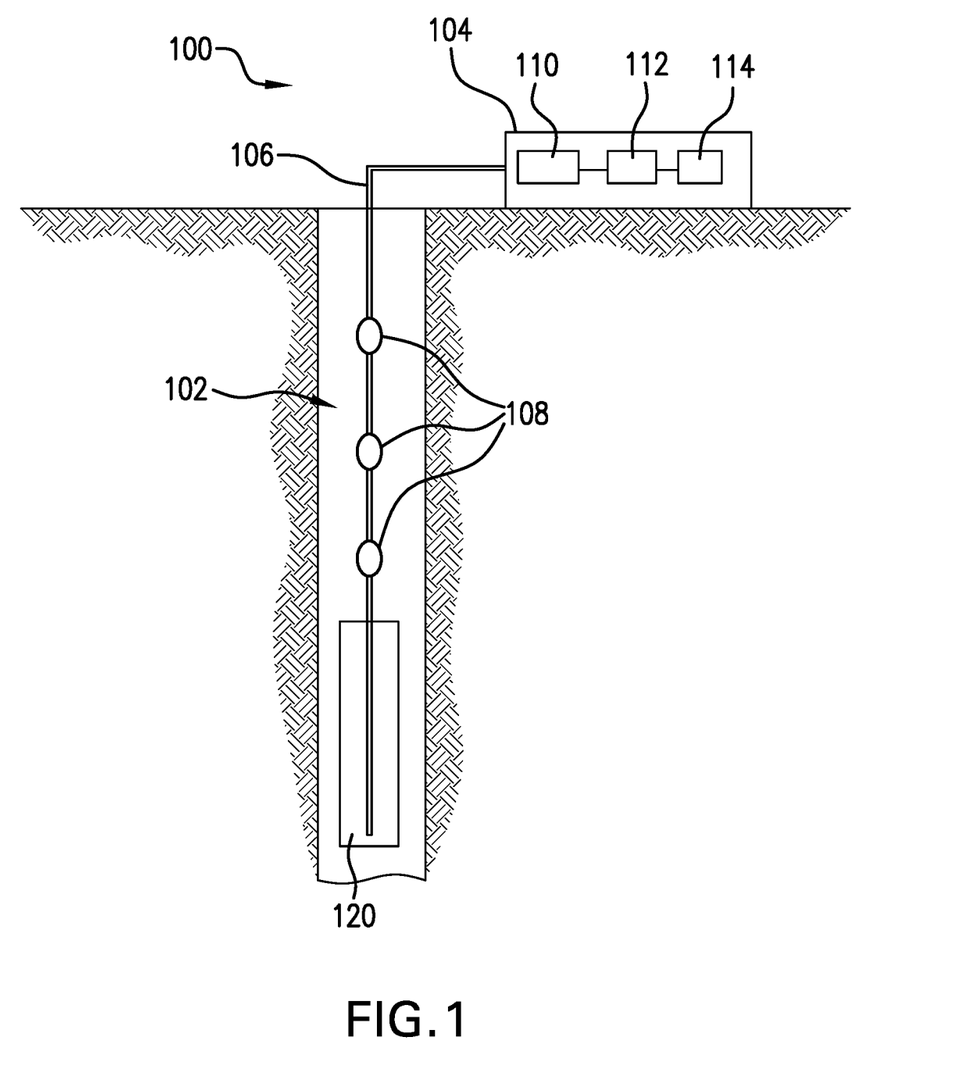
FIG. 1 shows an optical system for obtaining a measurement of a downhole parameter from a wellbore, in an illustrative embodiment.

Referring to FIG. 1, an optical system 100 for obtaining a measurement of a downhole parameter from a wellbore 102 is shown in an embodiment. In various embodiments, the optical system 100 is a Distributed Acoustic Sensing (DAS) system that uses light to measure acoustic signals or acoustic waves within the wellbore 102.

The optical system 100 includes an optical interrogation unit 104, generally at a surface location, and at least one optical fiber 106 extending from the optical interrogation unit 104 into the wellbore 102. A plurality of scatterers 108 are distributed along a length of the optical fiber sensor 106. The scatterers can be scattering sites within the optical fiber that reflected light due to Rayleigh scattering. The scatterers 108 can also include broadband Fiber Bragg Gratings (FBGs). In one embodiment, the optical fiber 106 is disposed on or in relation to a carrier or tool 120, such as a drill string segment, downhole tool or bottomhole assembly. As described herein, a "carrier" refers to any structure suitable for being lowered into a wellbore or for connecting a drill or downhole tool to the surface and is not limited to the structure and configuration described herein. Examples of carriers include casing pipes, wirelines, wireline sondes, slickline sondes, drop shots, downhole subs, bottomhole assemblies, drill string inserts, modules, internal housings and substrate portions thereof.

The optical interrogation unit 104 includes a laser 110 or other light source a detector 112 and a processor 114. The detector 112 may be any suitable type of photodetector such as a diode assembly. The detector 112 is configured to receive return signals reflected from the scatterers 108 and generate measurement data. Exemplary parameters that can be measured using the optical fiber 106 include temperature, strain, pressure, position, and vibration.

In operation, the laser 110 transmits a light pulse of into the optical fiber 106. The light pulse travels along the optical fiber 106 and is reflected back to the optical interrogation 104 from various locations within the optical fiber by the scatterers 108 therein. The reflected signal is received by the detector 112 and is analyzed at the processor 114 to estimate desired parameters. The spatial length of the light pulse within the optical fiber 106 is often referred to as the gauge length. Assuming the reflection magnitude of scatterers at each location along the optical fiber 106 is the same, the intensity of the reflected signal received at the detector 112 varies with the round trip optical distance between the optical interrogation unit 104 and the scatterer 108, in particular, by decreasing as optical distance increases.

Figure 2:
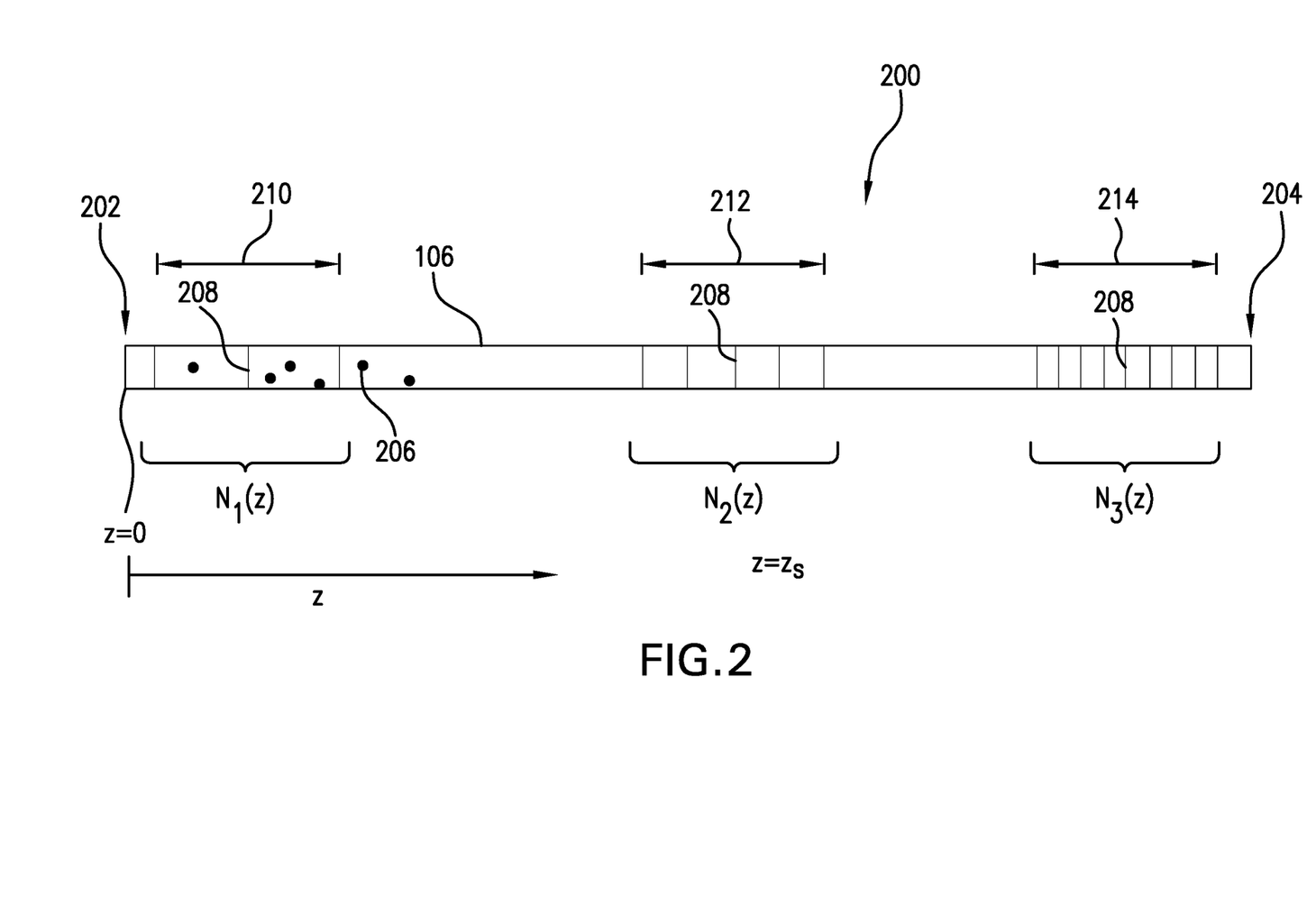
FIG. 2 shows a side view of an optical fiber of the optical system of FIG. 1.

FIG. 2 shows a side view 200 of the optical fiber 106 of FIG. 1, in an illustrative embodiment. The optical fiber 106 extends from a first end 202 (also referred to herein as a "launched end") and a second end 204. Light travels back and forth between the optical interrogation unit 104 and the optical fiber 106 at the first end 202. A distance along the optical fiber 106 is defined as z=0 at the first end 106. The second end 204 is distal from the optical interrogation unit 104.

The optical fiber 106 includes various scatterers 108, which can be Rayleigh scatterers 206 and/or enhancement scatterers 208. The Rayleigh scatterers 206 are due to imperfections occurring naturally therein along its length and can be evenly distributed along the length of the optical fiber 106. Enhancement scatterers 208 are scatterers that are added by some manufacturing or formation process. An example of an enhancement scatter 208 is a broadband Fiber Bragg grating (broadband FBG). The broadband FBG is designed to have reflection band that has a bandwidth greater than a bandwidth of a light from the laser 110. In various embodiments, a bandwidth of the laser 110 can be a narrow band of about 10^-7 nanometers, while the bandwidth of the broadband FBG is in a range from about 1 nm to about 10 nm. The wavelength of the laser 110 falls within the reflection band of the broadband FBG.

In various embodiments, a minimum number of enhancement scatterers 208 in the optical fiber 106 is 100. A distance of an enhancement scatterer 208 from the first end 202 is defined as $z=z_s$. A scattering intensity of an enhancement scatterer 208 indicates a strength of a signal reflected at the enhancement scatterer 208. In various embodiments, the strength of the scattering intensity at a given location of the optical fiber 106 is affected by a longitudinal density of the enhancement scatterers 208 within a gauge length located at the location. Longitudinal density or scatterer density refers to a number of enhancement scatterers 208 within a unit length of the optical fiber 106, such as the gauge length.

Three gauge lengths are shown along the optical fiber 106 in FIG. 2 for illustrative purposes. The gauge lengths are referred to as "first gauge length," "second gauge length" and "third gauge length." However, it is to be noted that each of these gauge lengths have the same length. The first gauge length 210, located near the first end 202, has a first longitudinal density $N_1(z)$ of scatterers 108 located therein. The second gauge length 212 is shown at midpoint between the first end 202 and the second end 204 and has a second longitudinal density $N_2(z)$ of scatterers 108 located therein. The third gauge length 214 is near the second end 204 and has a third longitudinal density $N_3(z)$ of scatterers 108 located therein. The longitudinal density of enhancement scatterers 208 increases as the distance z increases along the optical fiber 106. In other words, $N_1(z)<N_2(z)<N_3(z)$. Stated another way, the intra-gating spacing of the enhancement scatterers 208 decreases as the distance z increases, so that the intra-grating spacing is greatest for the first gauge length 210 and least for the third gauge length 214.

In one aspect, the longitudinal density of the enhancement scatterers 208 varies with length along the optical fiber 106 in order to reduce a difference in reflected signal intensity from enhancement scatterers 208 at different locations along the fiber as well as to enhance signals from enhancement scatterers 208 far from the optical interrogation unit 104. In various embodiments, the increase in longitudinal density with distance from the launched end can be an exponential increase, a first-order approximation to an exponential increase, or any suitable non-linear increase, in various embodiments.

The strength of the signal measured at the optical interrogation unit 104 from any location within the optical fiber 106 is due to two factors: signal loss due to the optical distance travelled along the optical fiber between the interrogation unit 104 and the location, and signal enhancement caused by enhancement scatterers 208 within a gauge length at the location. The signal loss due to distance travelled is greater at the third gauge length 214 than at the second gauge length, which is greater than at the first gauge length 210. By having a longitudinal density that increases with distance, the longitudinal density at the third gauge length 24 is greater than the longitudinal density at the second gauge length 212, with is greater than the longitudinal density at the first gauge length 210. The signal enhancement at the third gauge length 214 is thus greater than the signal enhancement at the second gauge length 212, which is greater than the signal enhancement at the first gauge length 210. In various embodiments, the increase in longitudinal density with distance can be selected so that the strength of the signal received at the optical interrogation unit 104 is the same or substantially the same between different locations in the optical fiber 106.

The spacing between enhancement scatterers 208 is limited due to practical considerations on both ends of the spacing range. The gauge length of the optical system sets a lower bound on longitudinal density (i.e., an upper bound to the intra-grating spacing). For example, to obtain a measurement for a certain gauge length, there must be at least one enhancement scatterer 208 within that gauge length at the location or there will be no enhancement at the location. Thus, in one embodiment, the intra-grating spacing is not greater than about 10 m. There is also an upper bound to longitudinal density (i.e., a lower bound to intra-grating spacing). The enhancement scatters 208 (i.e., FBGs), which have finite extent, cannot be so close that they begin to overlap. A suitable upper bound for intra-grating spacing is about 10 enhancement scatterer 208 per meter.

An enhancement scatterer 208 such as an FBG is created in the optical fiber 106 to reflect light at a wavelength of the light emitted by the optical interrogation unit 104. The total loss $L_{tot}(\lambda)$ associated with the FBG is given in Eq. (1):

$$L_{tot}(\lambda)=L_{res}(\lambda)+L_{nres}(\lambda) \quad (1)$$

where $L_{res}(\lambda)$ is the loss deliberately caused by writing the FBG and $L_{nres}(\lambda)$ is the loss caused by imperfections in the FBG. The fraction of light captured from the light reflected by the FBG can be defined as $$Cap_{FBG}(\lambda) = \frac{L_{res}(\lambda)}{L_{tot}(\lambda)} \quad (2)$$

In addition to loss at the FBG, loss can occur due to Rayleigh scattering within the optical fiber 106. The fraction of light captured from Rayleigh scattering is shown in Eq. (3):

$$Cap_{Ray} = \left(\frac{NA}{2n_{eff}}\right)^2 \quad (3)$$

where $n_{eff}$, is an effective index of the optical fiber and NA is a numerical aperture of the optical fiber, both of which are slightly wavelength dependent.

In general, the number of enhancement scatterers per unit length N(z) is a function of length z along the fiber. The signal loss along the optical fiber 106 is characterized, in part, by a total loss coefficient that is a linear function of loss due to Rayleigh scattering within the optical fiber and loss occurring at an enhancement scatterer, such as an FBG. The total loss coefficient is therefore given in Eq. (4):

$$\alpha_{Tot}(\lambda)=\alpha_{Ray}(\lambda)+N(z)L_{tot}(\lambda) \quad (4)$$

where $\alpha_{Tot}(\lambda)$ is the total loss coefficient, $\alpha_{Ray}(\lambda)$ is the loss due to Rayleigh scattering in the optical fiber, $L_{tot}(\lambda)$ is the loss at a scatterer. However, the FBG also provides an enhancement to a backscattered signal. The enhancement of a signal Enh($\lambda$, z) at a given wavelength of light due to the presence of the FBG can be written as shown in Eq. (5):

$$Enh(\lambda, z) = 10*\log 10\left[\frac{N(z)Cap_{FBG}(\lambda)L_{tot}(\lambda) + Cap_{Ray}(\lambda)\alpha_{Ray}(\lambda)}{Cap_{Ray}(\lambda)\alpha_{Ray}(\lambda)}\right] \quad (5)$$

The signal loss accumulated up to position $z_s$ in the optical fiber is related to the losses shown in Eq. (1) and Eq. (4) and can be written as shown in Eq. (6):

$$L_{fib}(\lambda,z_s)=\int_0^{z_s} 2[\alpha_{Ray}(\lambda,z)+N(z)L_{tot}(\lambda)]dz \quad (6)$$

Eq. (6) thus shows the dependence of loss on the FBG spacing N(z). A ratio of an intensity of the received signal $P_{ref}(\lambda, t(z_s), \Delta t_p)$ at a wavelength $\lambda$ of light to an original intensity $P_{launch}(\lambda)$ shown in Eq. (7):

$$\frac{P_{ref}(\lambda, t(z_s), \Delta t_p)}{P_{launch}(\lambda)} = \quad (7)$$

$$\Delta t_p \frac{c}{neff}\left[N(z_s)Cap_{FBG}(\lambda)L_{tot}(\lambda) + Cap_{Ray}(\lambda)\alpha_{Ray}(\lambda)\right]*10^{-\left(\frac{L_{fib}(\lambda,z_s)}{10}\right)}$$

where $\Delta t_p$ is a length of a pulse width of the light from the laser, and c is the speed of light in a vacuum.

Given an optical fiber having the attenuation described in Eqs. (1)-(7), a variation of longitudinal density N(z) with length can be determined that provides a constant effective enhancement of the signal with distance, as shown in Eq. (8):

$$10*\log 10[N(0)Cap_{FBG}(\lambda)L_{tot}(\lambda)+Cap_{Ray}(\lambda)\alpha_{Ray}(\lambda)]=$$
$$10*\log 10[N(z_s)Cap_{FBC}(\lambda)L_{tot}(\lambda)+Cap_{Ray}(\lambda)\alpha_{Ray}(\lambda)]-L_{fib}(\lambda,z_s) \quad (8)$$

The left-hand side of Eq. (8) is the signal enhancement at z=0 (the launched end) and the right-hand side of the Eq. (8) is the signal enhancement at the location z=$z_s$. The solution of Eq. (8) is an approximately exponential function N(z) that increases scatter density with distance from the first end 202 of the optical fiber 106.

In another embodiment, an optical fiber 106 can have FBGs arranged with an intra-grating spacing that is based on a first-order approximation of background loss in the optical fiber. For this approximation, the signal loss accumulated up to position $z_s$ in the optical fiber can be written as shown in Eq. (9):

$$L_{fib,approx}(\lambda,z_s)=\int_0^{z_s}2[\alpha_{Ray}(\lambda,z)]dz=2\alpha_{Ray}(\lambda)z_s \quad (9)$$

The FBG spacing for this signal loss can then determined as shown in Eq. (10):

$$10*\log 10[N(z_s)Cap_{FBC}(\lambda)L_{tot}(\lambda)+Cap_{Ray}(\lambda)\alpha_{Ray}(\lambda)]= Enh(\lambda,0)+2\alpha_{Ray}(\lambda)z_s \quad (10)$$

The longitudinal spacing that is a solution of Eq. (10) is a variable spacing that is approximately exponential with length, having a form as shown in Eq. (11):

$$N(z_s)=N(0)\exp(K\alpha_{Ray}(\lambda)z_s) \quad (11)$$

where K is a fitting constant.

Figure 3:
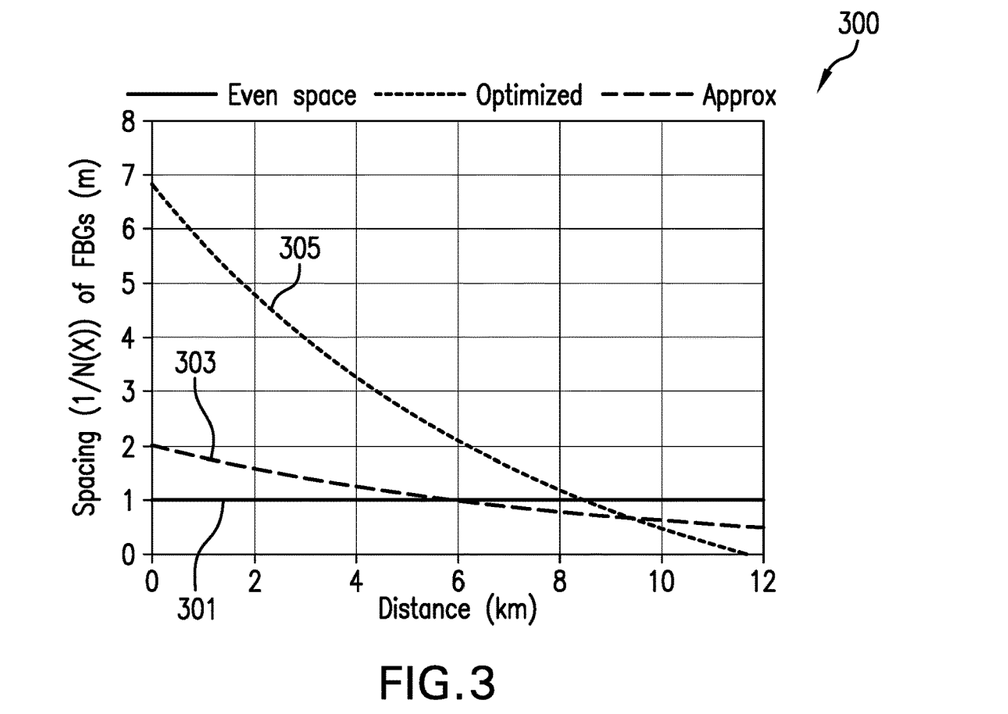
FIG. 3 shows a graph of intra-grating spacing with distance along the optical fiber.

FIG. 3 shows a graph 300 of intra-grating spacing with distance for three optical fibers. Distance along the optical fiber is shown in kilometers (km) along the abscissa and FBG spacing is shown in meters (m) along the ordinate axis. The intra-grating spacing of these FBGs is the inverse of the density function N(z). A first optical fiber includes FBGs that are spaced uniformly apart by 1 meter. A second optical fiber includes FBGs that are spaced variably. A third optical fiber includes FBGs that are spaced with an approximate exponential distribution.

Curve 301 shows the FBG spacing for the first optical fiber (even spacing). Curve 303 shows the FBG spacing for the second optical fiber having a spacing selected to vary to achieve 10 dB enhancement at all locations along the optical fiber. Curve 303 shows FBG spacing that decreases with distance but continues its decrease indefinitely. Curve 305 shows the FBG spacing for the third optical fiber (exponentially decreasing spacing). Curve 305 shows FBG spacing that decreases more rapidly and drops to 0 spacing at about 11.8 km, which is the distance at which the spacing between FBGs can no longer be reduced to produce 10 dB of enhancement given the accumulated loss.

Figure 4:
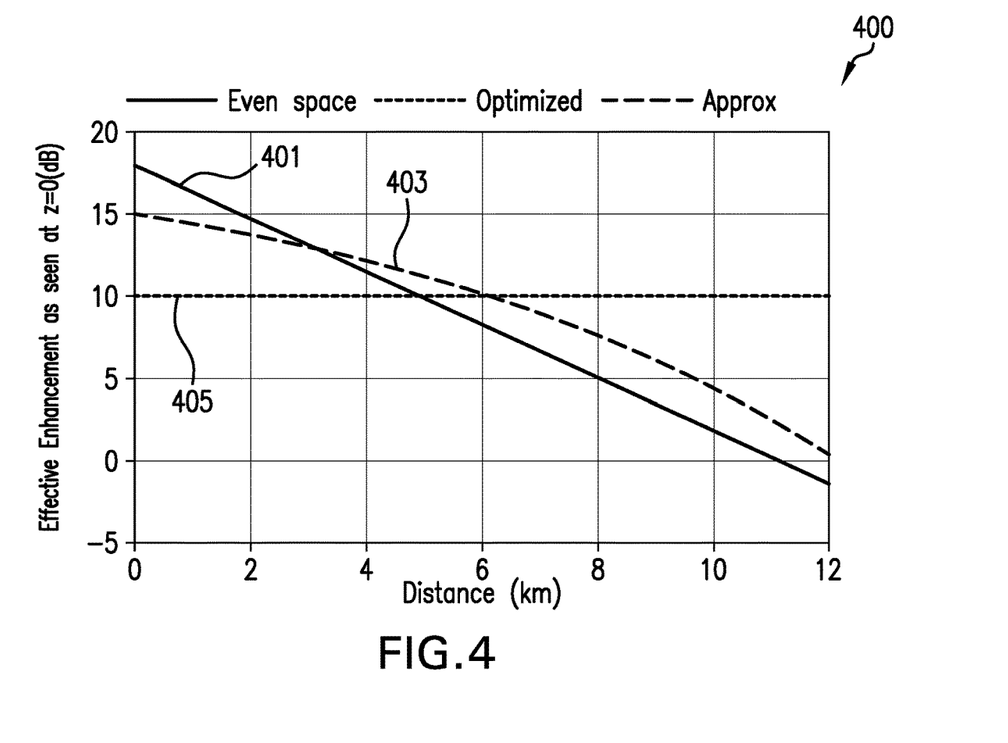
FIG. 4 shows a graph of the effective enhancement of a signal with distance.

FIG. 4 shows a graph 400 of the effective enhancement of a signal with distance. Distance along the optical fiber is shown in kilometers (km) along the abscissa and the effective enhancement at z=0 is shown in decibels (dB) along the ordinate axis. Curve 401 shows the effective enhancement for the first optical fiber. Curve 403 shows the effective enhancement for the second optical fiber. Curve 405 shows the effective enhancement for the third optical fiber.

The effective enhancement of the first optical fiber is at about 18 dB at the launched end (z=0). The effective enhancement decreases linearly with distance but remains over 10 dB out to about 5 km, eventually dropping to 0 dB at about 11 km. The effective enhancement of the second optical fiber achieves exactly 10 dB of enhancement for as far along the optical fiber as possible. The effective enhancement of the third optical fiber is about 15 dB at the launched end and maintains a value over 10 dB out to about 6 km, eventually dropping to zero at about 12 km.

Figure 5:
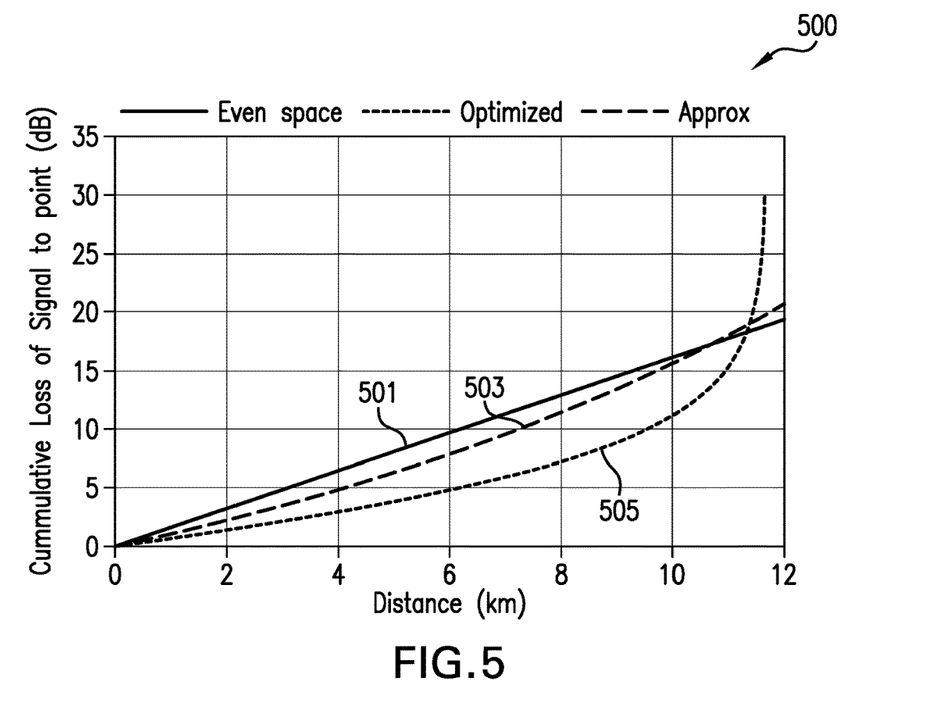
FIG. 5 shows a graph of a cumulative loss of a signal with distance.

FIG. 5 shows a graph 500 of a cumulative loss of a signal with distance. Distance along the optical fiber is shown in kilometers (km) along the abscissa and cumulate loss is shown in decibels (dB) along the ordinate axis. Curve 501 shows the cumulative loss for the first optical fiber. Curve 503 shows the cumulative loss for the second optical fiber. Curve 505 shows the cumulative loss for the third optical fiber.

The first optical fiber (Curve 501) accumulates loss equally over distance, as evidenced by the linear relation of cumulative loss with distance. The loss accumulates at a rate of about 1.6 dB/km. The cumulative loss (Curve 503) of the second optical fiber is improved (i.e., less lossy) over the that of the cumulative loss (Curve 501) of the first optical fiber up to a distance of about 10.5 km. The cumulative loss (Curve 505) of the third optical fiber is improved over both that of the first optical fiber and that of the second optical fiber up to a distance of about 11 km. However, high loss occurs in the third fiber above about 11 km.

Figure 6:
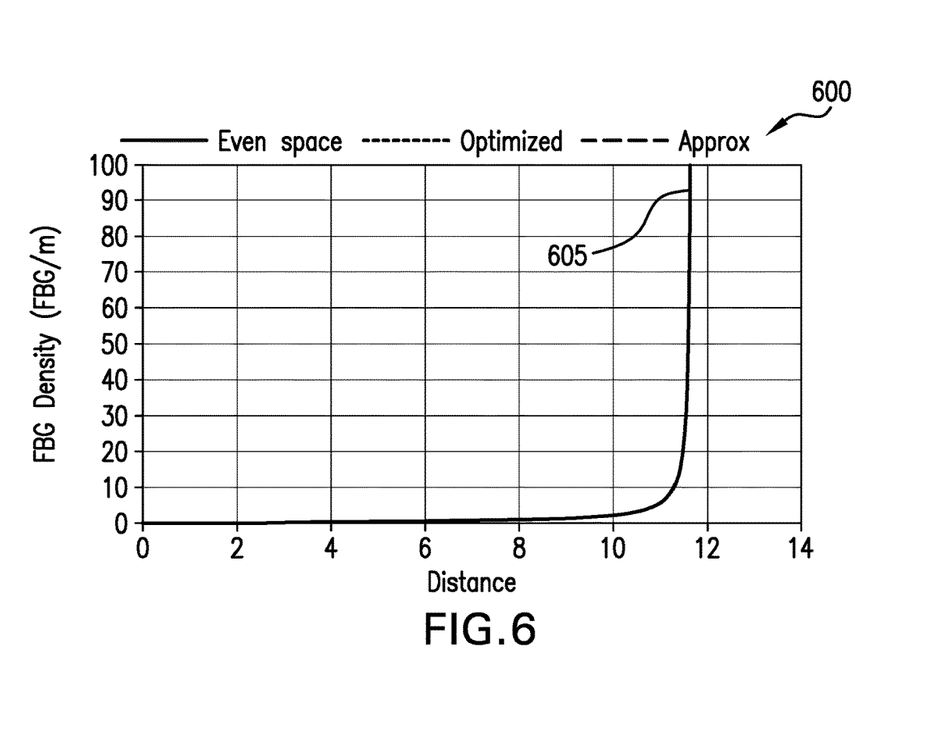
FIG. 6 shows a graph of Fiber Bragg Grating density with distance.

FIG. 6 shows a graph 600 of FGB density with distance. Distance along the optical fiber is shown in kilometers (km) along the abscissa and cumulate loss is shown in decibels (dB) along the ordinate axis. Curve 605 shows the FBG density for the third optical fiber.

Referring back to FIG. 5, the onset of high loss can be delayed by allowing the FBG spacing to increase. However, the cumulative loss (Curve 505) of the third fiber runs into a wall of high loss at a distance at which when the density of FBGs can no longer be increased as rapidly as required by loss accumulation requires. Referring to FIG. 6, curve 605 illustrates how rapidly the FBG density has to increase to maintain signal enhancement near a distance of about 11.8 km.

It is noted that same enhancement can be achieved by changing a strength of the FBGs, which can be selected by varying an exposure time of a writing beam used in forming the FBGs in the optical fiber.

Set forth below are some embodiments of the foregoing disclosure:

Embodiment 1. An optical system for measuring an acoustic signal in a wellbore. The optical system includes a light source, an optical fiber and a detector. The light source generates a light pulse. The optical fiber has a first end for receiving the light pulse from the light source and a plurality of enhancement scatterers spaced along a length of the optical fiber for reflecting the light pulse, wherein a longitudinal density of the enhancement scatterers increases with a distance from the first end to increase a signal enhancement generated by the enhancement scatterers distal from the first end. The detector is at the first end of the optical fiber and measures a reflection of the light pulse at the enhancement scatterers to determine the acoustic signal.

Embodiment 2. The optical system of any prior embodiment, wherein the plurality of enhancement scatterer includes a broadband Fiber Bragg grating.

Embodiment 3. The optical system of any prior embodiment, wherein the light source is a laser and a reflection bandwidth of the broadband Fiber Bragg grating is greater than a bandwidth of the laser and includes a central wavelength of the laser.

Embodiment 4. The optical system of any prior embodiment, wherein the longitudinal density of the scatterers in the optical fiber increases as one of: (i) an exponential function; (ii) an approximately exponential function; (iii) a linear function; and (iv) a non-linear function.

Embodiment 5. The optical system of any prior embodiment, wherein a signal enhancement from a gauge length of the optical fiber increases with distance of the gauge length from the light source in relation to a longitudinal density of enhancement scatterers within the gauge length.

Embodiment 6. The optical system of any prior embodiment, wherein the light source, optical fiber and detector are used as a Distributed Acoustic Sensing system.

Embodiment 7. The optical system of any prior embodiment, wherein the number of enhancement scatterers in the optical fiber is greater than or equal to 100.

Embodiment 8. The optical system of any prior embodiment, wherein a first longitudinal density of enhancement scatterers within a first gauge length at a first location near the light source is less than a second longitudinal density of enhancement scatterers within a second gauge length at a second location away from the light source, wherein a signal enhancement from the second gauge length is greater than a signal enhancement from the first gauge length.

Embodiment 9. A method for obtaining an acoustic measurement in a wellbore. A pulse of light is transmitted from a light source into a first end of an optical fiber, the optical fiber having a plurality of enhancement scatterers spaced along a length of the optical fiber for enhancing the light signal, wherein a longitudinal density of the enhancement scatterers decreases with a distance from the first end to increase a signal enhancement generated by enhancement scatterers distal from the first end. A reflection of the light pulse from the enhancement scatterers is received at a detector at the first end to determine the acoustic signal.

Embodiment 10. The method of any prior embodiment, wherein the plurality of enhancement scatterer includes a broadband Fiber Bragg grating.

Embodiment 11. The method of any prior embodiment, wherein the light source is a laser and a reflection bandwidth of the broadband Fiber Bragg grating is greater than a bandwidth of the laser and includes a central wavelength of the laser.

Embodiment 12. The method of any prior embodiment, wherein the light source is a laser and a bandwidth of the enhancement scatterer is greater than a bandwidth of the laser.

Embodiment 13. The method of any prior embodiment, wherein the density of the scatterers in the optical fiber decreases as one of: (i) an exponential function; (ii) an approximately exponential function; (iii) a linear function; and (iv) a non-linear function;.

Embodiment 14. The method of any prior embodiment, wherein a signal enhancement from a gauge length of the optical fiber increases with distance of the gauge length from the light source in relation to a longitudinal density of enhancement scatterers within the gauge length.

Embodiment 15. The method of any prior embodiment, wherein a first longitudinal density of enhancement scatterers within a first gauge length at a first location near the light source is less than a second longitudinal density of enhancement scatterers within a second gauge length at a second location away from the light source, wherein a signal enhancement from the second gauge length is greater than a signal enhancement from the first gauge length.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An optical system for measuring an acoustic signal in a wellbore, comprising:
    a light source for generating a light pulse at a central wavelength;
    an optical fiber having a first end for receiving the light pulse from the light source and a plurality of enhancement scatterers spaced along a length of the optical fiber, each of the plurality of enhancement scatterers reflecting the light pulse at the central wavelength, wherein a longitudinal density of the enhancement scatterers increases with a distance from the first end to increase a signal enhancement generated by the enhancement scatterers distal from the first end; and
    a detector at the first end for measuring a reflection of the light pulse at the enhancement scatterers to determine the acoustic signal.

2. The optical system of claim 1, wherein the plurality of enhancement scatterer includes a broadband Fiber Bragg grating.

3. The optical system of claim 2, wherein the light source is a laser and a reflection bandwidth of the broadband Fiber Bragg grating is greater than a bandwidth of the laser and includes a central wavelength of the laser.

4. The optical system of claim 1, wherein the longitudinal density of the scatterers in the optical fiber increases as one of: (i) an exponential function; (ii) an approximately exponential function; and (iii) a linear function.

5. The optical system of claim 1, wherein a signal enhancement from a gauge length of the optical fiber increases with distance of the gauge length from the light source in relation to a longitudinal density of enhancement scatterers within the gauge length.

6. The optical system of claim 1, wherein the light source, optical fiber and detector are used as a Distributed Acoustic Sensing system.

7. The optical system of claim 1, wherein the number of enhancement scatterers in the optical fiber is greater than or equal to 100.

8. The optical system of claim 1, wherein a first longitudinal density of enhancement scatterers within a first gauge length at a first location near the light source is less than a second longitudinal density of enhancement scatterers within a second gauge length at a second location away from the light source, wherein a signal enhancement from the second gauge length is greater than a signal enhancement from the first gauge length.

9. A method for obtaining an acoustic measurement in a wellbore, comprising:
    transmitting a pulse of light from a light source at a central wavelength into a first end of an optical fiber, the optical fiber having a plurality of enhancement scatterers spaced along a length of the optical fiber, each of the plurality of enhancement scatterers reflecting the light signal at the central wavelength, wherein a longitudinal density of the enhancement scatterers decreases with a distance from the first end to increase a signal enhancement generated by enhancement scatterers distal from the first end; and
    receiving a reflection of the light pulse from the enhancement scatterers at a detector at the first end to determine the acoustic signal.

10. The method of claim 9, wherein the plurality of enhancement scatterer includes a broadband Fiber Bragg grating.

11. The method of claim 10, wherein the light source is a laser and a reflection bandwidth of the broadband Fiber Bragg grating is greater than a bandwidth of the laser and includes a central wavelength of the laser.

12. The method of claim 9, wherein the light source is a laser and a bandwidth of the enhancement scatterer is greater than a bandwidth of the laser.

13. The method of claim 9, wherein the density of the scatterers in the optical fiber decreases as one of: (i) an exponential function; (ii) an approximately exponential function; and (iii) a linear function.

14. The method of claim 9, wherein a signal enhancement from a gauge length of the optical fiber increases with distance of the gauge length from the light source in relation to a longitudinal density of enhancement scatterers within the gauge length.

15. The method of claim 9, wherein a first longitudinal density of enhancement scatterers within a first gauge length at a first location near the light source is less than a second longitudinal density of enhancement scatterers within a second gauge length at a second location away from the light source, wherein a signal enhancement from the second gauge length is greater than a signal enhancement from the first gauge length.

* * * * *